United States Patent [19]

Culpepper

[11] Patent Number: 5,676,384
[45] Date of Patent: Oct. 14, 1997

[54] ANTI-EXTRUSION APPARATUS MADE FROM PTFE IMPREGNATED STEEL MESH

[75] Inventor: Jess L. Culpepper, Humble, Tex.

[73] Assignee: CDI Seals, Inc., Humble, Tex.

[21] Appl. No.: 612,121

[22] Filed: Mar. 7, 1996

[51] Int. Cl.$^6$ .................................................. F16J 15/20
[52] U.S. Cl. ......................... 277/188 A; 277/235 R; 277/DIG. 6; 29/888.3
[58] Field of Search ............... 277/188 R, 188 A, 277/230, 235 R, DIG. 6; 29/505, 888.3; 156/184, 192, 194

[56] References Cited

U.S. PATENT DOCUMENTS

| | | | |
|---|---|---|---|
| 2,654,433 | 2/1953 | Piety | 166/1 |
| 3,219,503 | 11/1965 | Blair | 277/230 |
| 3,341,211 | 9/1967 | Houghton et al. | 277/230 |
| 3,646,846 | 3/1972 | Houghton et al. | 277/239 |
| 4,219,204 | 8/1980 | Pippert | 277/188 A |
| 4,258,926 | 3/1981 | Upton | 277/116.4 |
| 4,326,588 | 4/1982 | McStravick | 277/188 A |
| 4,559,248 | 12/1985 | Sumiyoshi et al. | 277/230 |
| 4,559,249 | 12/1985 | Arigaya et al. | 277/230 |
| 4,601,476 | 7/1986 | Usher et al. | 277/230 |
| 4,665,978 | 5/1987 | Luke | 166/196 |
| 4,709,758 | 12/1987 | Preston, Jr. | 166/120 |
| 4,730,835 | 3/1988 | Wilcox et al. | 277/230 |
| 4,753,444 | 6/1988 | Jackson et al. | 277/230 |
| 5,065,493 | 11/1991 | Ozora | 277/230 |
| 5,165,703 | 11/1992 | Morvant | 277/188 A |
| 5,493,951 | 2/1996 | Harrison | 277/188 A |

*Primary Examiner*—Scott Cummings
*Attorney, Agent, or Firm*—David M. O'Brian

[57] ABSTRACT

A low friction, dry lubricant impregnated anti-extrusion apparatus for engagement with an annular seal or packer, wherein said packer is used to seal the annular space of a well or pipe bore. The low friction, dry lubricant impregnated anti-extrusion apparatus being designed to generally avoid absorption of the compression setting forces, wherein the compression setting forces are in turn substantially transmitted through the anti-extrusion apparatus to the packer to effect radial expansion of the packer to seal the annular space, while generally preventing the extrusion of the packer at high pressures and avoiding high frictional contact between the anti-extrusion apparatus and an inner surface of the well or pipe bore.

9 Claims, 4 Drawing Sheets

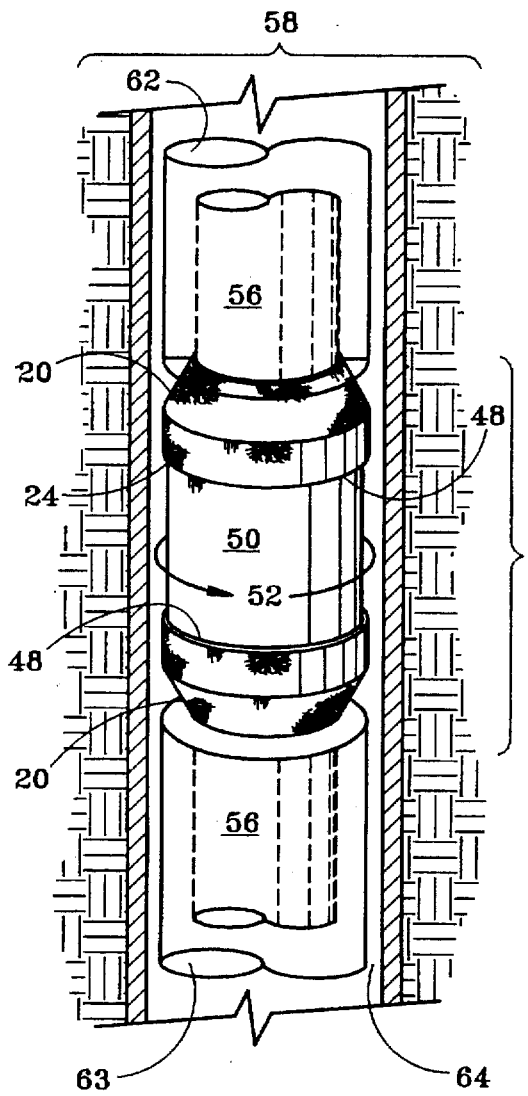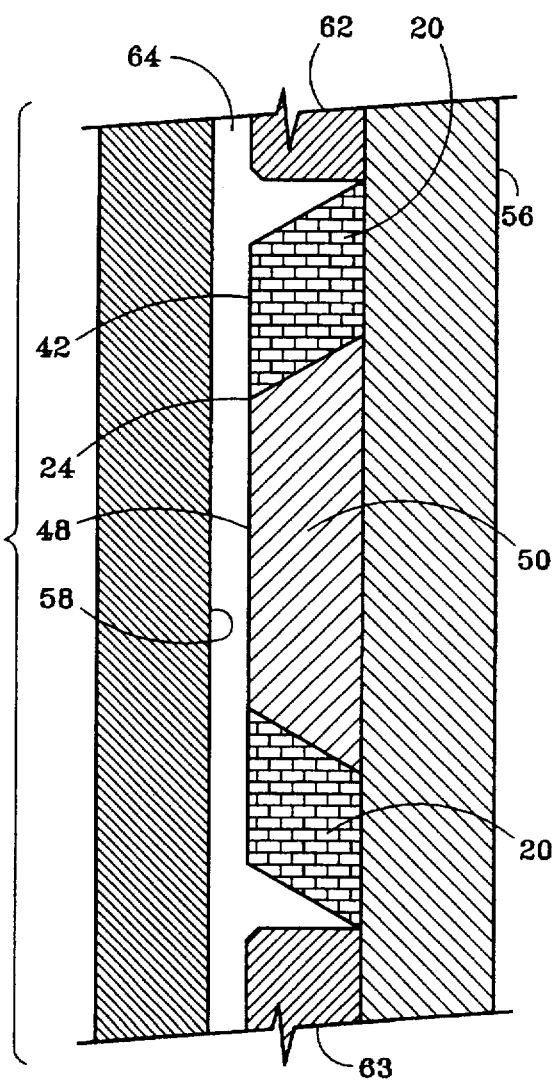
FIG.6
FIG.7

ANTI-EXTRUSION APPARATUS MADE FROM PTFE IMPREGNATED STEEL MESH

FIELD OF THE INVENTION

The present invention relates generally to an anti-extrusion apparatus for engagement with an elastomeric annular seal member, to prevent the extrusion of the seal, during compression. Specifically, the present invention relates to a low friction, dry lubricant impregnated anti-extrusion apparatus for engagement with an elastomeric annular seal to prevent extrusion of the seal, such that when the anti-extrusion apparatus, in combination with the annular seal, is subjected to axial compression setting forces, the frictional forces between the anti-extrusion apparatus and the inside wall of the tubular member are reduced, thereby reducing the amount of compression setting forces needed to radially expand the seal and increasing the mount of axial load which can be applied to the seal.

BACKGROUND OF THE INVENTION

Expandable seal members, commonly referred to in the oil and gas industry as "packers," are used to seal or close-off the annular area within a tubular member or well bore, known as the "annulus." The annulus is defined as the open area between the inner diameter of the well bore or inner diameter of the tubular member and the outer diameter of the drill pipe or tubing, disposed within the well bore or tubular member. The packer body may be cylindrically shaped and typically has a smaller outer diameter as compared to the inner diameter of the particular tubular member to be sealed, and is thus easily inserted and positioned within the tubular member. Expandable packers may, for example, be constructed of rubber or some other elastomeric material and preferably include a central axial bore through which various types of tools or tubing may be inserted. A mandrel may, for example, be inserted through the axial bore of the packer, wherein the packer and mandrel are positioned within the tubular member at a predetermined location, and/or depth, in the case of a subterranean well. Activation of the mandrel in combination with an upper sleeve member and a lower sleeve member, creates axial compression setting forces which are applied to the axial ends of the packer body. The axial compression setting forces result in the radial expansion of the packer body and generally create an interface or contact between the radially expanded packer body and the inner wall of the tubular member, to effectively seal the annulus. During the radial expansion of the packer body, it is important that the packer body effectively seal the annulus of the tubular member, especially in oil and gas wells, where water and/or water bearing intervals must be effectively sealed off from hydrocarbon producing intervals. In the absence of employing an anti-extrusion device between the packer body and the upper and lower sleeve members, the compression setting forces can extrude or deform the packer body and may thereby destroy the packer body and/or the seal created by the compression of the packer body in contact with the inner wall of the tubular member or well bore.

Double die formed seal back-up devices constructed of wire mesh, such as Wilcox et al., U.S. Pat. No. 4,730,835, are known in the industry. However, due to the rigid nature of metals, including metallic wire mesh, the spring-like or biased quality of the metal creates high frictional forces between the wire mesh and the inner wall of the tubular member during compression of the upper and lower sleeve members. The use of known seal back-up devices, normally requires that excessive compression setting forces must be employed in attempting to overcome the high frictional forces created between the seal back-up device and the inner wall of the tubular member, during compression. Often, these frictional forces between the seal back-up device and the inside wall of the tubular member are so extreme that they can not be offset by excessive compression setting forces, thereby preventing the transmission of adequate compression setting forces to the packer body, and precluding the formation of an effective seal of the annular area of the well bore or tubular member. Further, in applying these excessive compression setting forces to the seal back-up devices, the seal back-up devices may become permanently deformed and may even "bite," "gouge," or "cut" into the inner surface of the tubular member. Additionally, excessive compression setting forces generally add to an existing problem, by increasing the high frictional forces between the wire mesh members and the inner surface of the liner or casing, which restricts the application of additional axial load on the wire mesh and thereby inhibits the ability to radially expand the packer to seal the annular area. The restrictive operation of these known seal back-up devices and the need for excessive compression setting forces to attempt to engage these devices, make their use problematic and inefficient.

Moreover, non-resilient, high temperature seal elements formed primarily of graphite have been employed to sealingly engage a well conduit bore, such as Luke, U.S. Pat. No. 4,665,978 and Preston, Jr., U.S. Pat. No. 4,709,758. These seal elements have no application for preventing the extrusion of the packer body during compression and have no application for efficiently transmitting substantially all of the compression setting forces to the packer body, while generally avoiding the biting and high frictional contact with the inner wall of the tubular member.

Therefore, a need exists for a singly die formed, low friction, dry lubricant impregnated anti-extrusion apparatus, for use in association with an elastomeric packer body, to generally prevent the extrusion of the compressed packer body disposed within and in sealing contact with an inner wall of a tubular member, wherein the anti-extrusion device transmits substantially all of the compression setting forces to the packer body in the absence of biting and high frictional contact with the inner surface of the tubular member. Although the need for such a device has been long felt, the prior art heretofore has not provided such a device which overcomes all of the aforementioned drawbacks.

Additional features and advantages of the invention will be set forth in part in the description which follows, and in part will become apparent from the description, or may be learned by practice of the invention. Features and advantages of the invention may be realized by means of the combinations and steps particularly pointed out in the appended claims.

SUMMARY OF THE INVENTION

To achieve the foregoing features and advantages and in accordance with the purpose of the invention as embodied and broadly described herein, a preferred embodiment low friction, dry lubricant impregnated anti-extrusion apparatus is presented to conduct, convey, transmit and/or otherwise transfer substantially all of the axial compression setting forces applied to the anti-extrusion apparatus, to an elastomeric seal or packer, disposed within a tubular member to effectively seal the annulus of the tubular member, while generally preventing the extrusion of the packer. The preferred embodiment anti-extrusion apparatus generally prevents the extrusion of the packer in the absence of creating high frictional contact between the anti-extrusion apparatus and the inner wall surface of the tubular member. The preferred embodiment anti-extrusion apparatus includes a compressible ring-shaped mesh structure or body, formed from at least one strand and having a plurality of pores therein. The ring-shaped mesh structure can, for example, be produced from a plurality of overlapped woven or knitted wire layers, including knitted wire tube and sock layers. The mesh tube or sock may, for example, be composed of one or more strands from a single material or may be formed of a combination of various types of materials. For example, these materials may include, but are not limited to stainless steel, various metallic alloys, plastic or polymer material, and organic fibrous material. One or more layers of the mesh tube or sock may then be assembled in a layer configuration and "rolled" to form a non-compressed ring-shaped, mesh structure for impregnation with a dry lubricant. The pre-molded, non-compressed, mesh structure has an outer radial circumference and a smaller, concentric axial bore extending through the mesh structure. Prior to the die forming of the mesh structure, the pores of the mesh structure are preferably impregnated with a dry lubricant or anti-friction material. The dry lubricant or anti-friction material may, for example, include polytetrafluoroethylene, carbon powder, grafoil or molybdenum disulfide. The ring-shaped mesh structure, having a substantial portion of its pore space impregnated with dry lubricant, is then die formed and molded into a particular shape for application with the packer body. The die forming of the present invention may, for example, be formed to resemble a "dish-shaped" ring, having an outer frustroconical shaped surface for contact with the axial compression setting forces and an inner concave shaped surface for engagement with an axial end of a packer body. The die forming of the present invention is not limited to a particular shape. The present invention can, for example be formed into the shape of a right circular cylinder or any generally circular shape, having an axial bore therethrough.

In operation, compression setting forces may be exerted against the frustroconical end of the dry lubricant impregnated anti-extrusion apparatus to "set" or radially expand the packer, using a mandrel in operative association with an upper sleeve member and a lower sleeve member, or other compression tool combination. In the present invention, substantially all of the compression setting forces are transmitted through the low friction, dry lubricant impregnated anti-extrusion apparatus to the axial end of the packer body, causing the packer body to expand radially outward and seal or close off the annulus of the tubular member. The impregnation of the dry lubricant in the mesh body, fills generally all of the pores of the mesh structure, such that when compression setting forces are applied to the mesh structure, the internal friction, which would otherwise be present within the mesh structure, is greatly diminished. In this manner, the friction normally created between the mesh structure and the inner diameter of the tubular wall, during compression, is also greatly reduced. In the absence of substantially filling the pore spaces with dry lubricant, the axial compression setting forces would otherwise be substantially absorbed by the open pore spaces of the mesh anti-extrusion apparatus, thus diverting the compression setting forces away from the packer body. Where conventional axial compression pressures, for example 30,000 pounds per square inch (psi), might normally be applied to radially expand the packer body to seal the annulus, the present invention greatly reduces the amount of axial compression force actually required to radially expand the packer body, thereby improving the sealing ability of the packer and reducing the risk of extrusion or deformation of the packer body. In addition to the more efficient transfer of compression forces to the packer body, the present invention can reduce the amount of axial compression force required to radially expand the packer body to seal the annulus of the tubular member, by up to 40%. In the absence of using a dry lubricant impregnated anti-extrusion apparatus, excessive axial compression setting forces would be necessary to attempt to set or radially expand the packer body. The application of excessive compression setting forces on non-dry lubricant impregnated anti-extrusion devices, can not generally provide for the conveyance of large axial loads to be applied to the packer body, due to the resistance created by the friction between the non-dry lubricant impregnated anti-extrusion devices and the tubular member. The dry lubricant impregnated anti-extrusion apparatus of the present invention, deforms and compresses easily, with little resistance, in response to the application of minimal axial compression setting forces. During compression, the dry lubricant impregnated anti-extrusion apparatus spreads outward in a radial manner between the source of the compression setting forces and the packer body, transmitting substantially all of the compression setting forces to the packer body. Radial expansion of the dry lubricant impregnated anti-extrusion apparatus generally forms a non-damaging and low frictional contact with the inner wall of the tubular member, while preventing the extrusion of the packer body. The impregnation of the dry lubricant into the mesh structure provides a low friction, anti-extrusion apparatus for use with elastomeric packers, which generally avoids extrusion of the packer body while transmitting substantially all of the compression setting forces through the anti-extrusion apparatus to the packer body, resulting in greater efficiency and less compression force needed for setting the packer, while at the same time generally avoiding the high frictional or harmful contact between the compressed mesh structure and the inner surface of the tubular member. The additional benefits of the dry lubricant impregnated anti-extrusion apparatus, include but are not limited to the relative ease with which the anti-extrusion apparatus and packer body can be removed from the tubular member.

BRIEF DESCRIPTION OF THE DRAWINGS

The accompanying drawings which are incorporated into and constitute a part of this specification, illustrate a preferred embodiment of the invention and together with the general description of the invention given above and the detailed description of the preferred embodiment given below, serve to explain the principals of the invention.

FIG. 6 is a front view of two non-compressed, dry lubricant impregnated anti-extrusion apparatuses of the present invention, centrally retained by a mandrel and disposed within a tubular member, wherein the concave ends of each dry lubricant impregnated anti-extrusion apparatus are engaged to opposing axial ends of a non-compressed packer body, all of which are concentrically retained by the compression setting tool.

FIG. 7 is a cross-sectional view of the two non-compressed dry lubricant impregnated anti-extrusion apparatuses and packer body, as depicted in FIG. 6.

The above general description and the following detailed description are merely illustrative of the generic invention and additional modes, advantages and particulars will be readily suggested to those skilled in the art without departing from the spirit and scope of the invention.

DETAILED DESCRIPTION OF THE INVENTION

Figure 1:
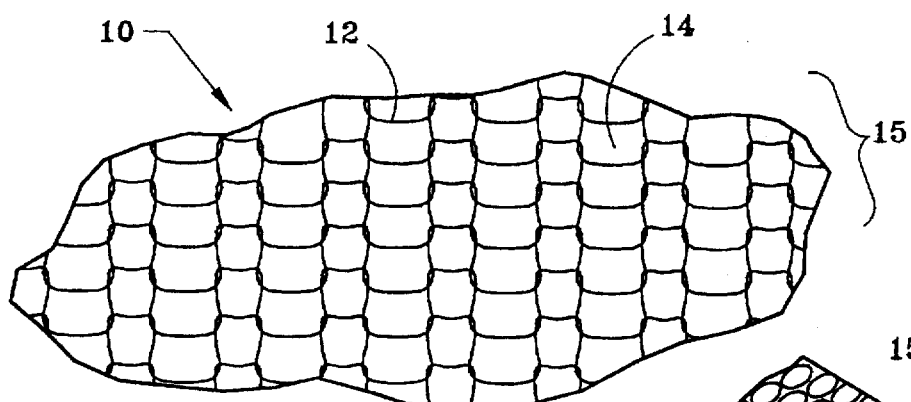
FIG. 1 is a front view of a single layer of mesh material used to form the present invention.
Figure 2:
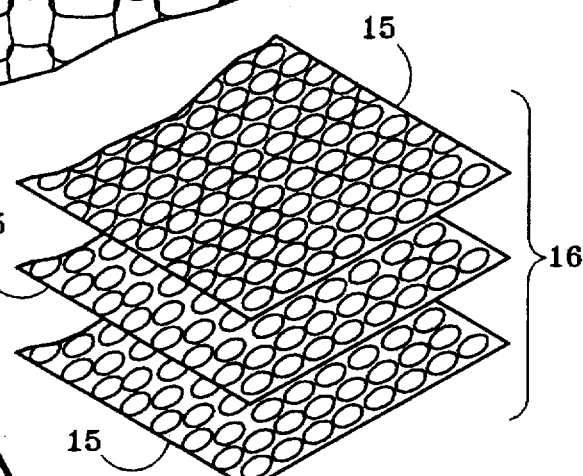
FIG. 2 is a partial cut-away, perspective view of a rolled multi-layered assembly of mesh material, as depicted in FIG. 1.
Figure 3:
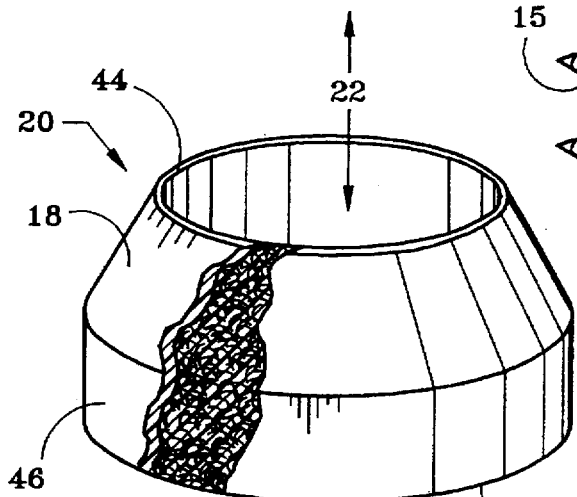
FIG. 3 is a perspective view of the die formed, dry lubricant impregnated anti-extrusion apparatus, embodying the features of the present invention.

With reference to the drawings wherein like parts are designated by like numerals, FIG. 1 illustrates a single layer 15 of mesh material 10 used to form the present invention. The mesh material 10, may for example, be composed of one or more strands 12 of the following materials, including stainless steel, various metallic alloys, plastic or polymer material, and organic fibrous material. The mesh material 10, is generally constructed to form the continuous layer 15, having a plurality of pores 14 therein. A plurality of continuous layers 15 of mesh material 10, may then, for example be assembled in an overlapping manner to form a rolled multi-layered assembly 16 as depicted in FIG. 2. The assembly 16 may then preferably be pressed and rolled into a ring-shaped mesh structure 17, shown in FIG. 2A. The pores 14 of the ring-shaped mesh structure 17 are then impregnated with a dry lubricant material 18, as shown in FIG. 3. The dry lubricant material 18 may be impregnated into the pores 14 of the ring-shaped mesh structure 17 by any conventional means such as by injection means (not shown), manually filling the pores 14 and immersing the ring-shaped mesh structure 17 directly into the dry lubricant material 18. The preferred dry lubricant material 18 may, for instance, have the desirable characteristics of being a solid, non-liquid, cohesive, inorganic material, having favorable application for use in a wide range of temperatures and pressures and providing excellent anti-friction and lubricant properties. One such dry lubricant material 18 which meets these characteristics is polytetrafluoroethylene. Further, polytetrafluoroethylene is easier and less hazardous to handle as compared to various petroleum based lubricants and does not dilute, smear, leak, stain, evaporate, dissipate or breakdown over time as do many known petroleum based lubricants and is effective at high temperatures and pressures. Although polytetrafluoroethylene may be the preferred dry lubricant for use with the present invention, other lubricants including but not limited to carbon powder, grafoil and molybdenum disulfide, may also be used.

Figure 4:
FIG. 4 is a cross-sectional view of the dry lubricant impregnated anti-extrusion apparatus depicted in FIG. 3.
Figure 5:
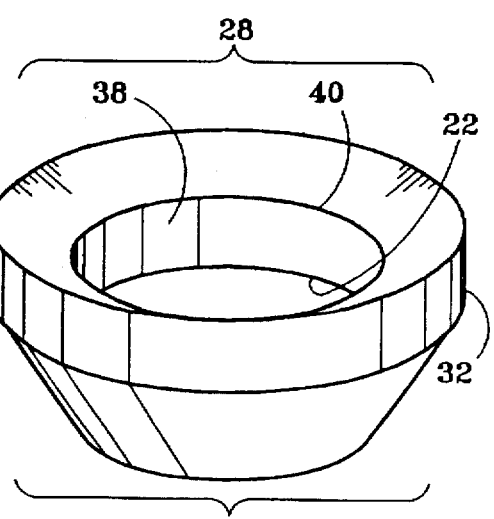
FIG. 5 is an inverted, perspective view of the dry lubricant impregnated anti-extrusion apparatus depicted in FIG. 3.
Figure 2A:
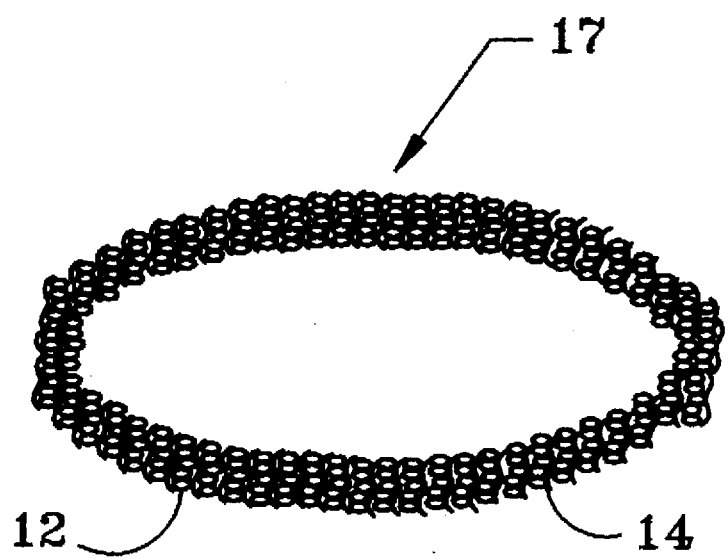
FIG. 2A is a perspective view of a ring-shaped mesh structure, prior to impregnation with dry lubricant and prior to die formation.

The rolled non-die formed, non-molded, dry lubricant impregnated ring-shaped structure 17, as shown in FIG. 2A, after having been impregnated with the dry lubricant material 18, is then die-formed to produce a dry lubricant impregnated anti-extrusion apparatus 20, of the present invention, as depicted in FIG. 3. The die formation of the dry lubricant impregnated anti-extrusion apparatus 20 molds the dry lubricant impregnated ring-shaped structure 17 into a dish-shaped or bowl-shaped configuration, having a concentric axial bore 22 and an outer radial circumference 24. As illustrated in FIGS. 3, 4 and 5, the dry lubricant impregnated anti-extrusion apparatus 20 includes an outer convex surface 26 and an inner frustroconical shaped surface 28. The compaction of the dry lubricant 18 within the pores 14 of the ring-shaped mesh structure 17, during the die formation step, produces a generally smooth, dry, non-marking surface texture 46 on the outer frustroconical shaped surface 26 and the inner concave surface 28 of the dry lubricant impregnated anti-extrusion apparatus 20. The outer frustroconical shaped surface 26 preferably includes a first inclined portion 30 and an outer longitudinal portion 32, wherein the first inclined portion 30 and the outer longitudinal portion 32 meet at a first junction 34. The first junction 34 may be defined as having a circumference substantially equal to the outer maximum radial circumference 24, and equal to the circumference of the outer longitudinal portion 32 and substantially equal to a maximum circumference of the first inclined portion 30. The inner concave surface 28 preferably includes a second inclined portion 36 and an inner longitudinal portion 38. The second inclined portion 36 and the inner longitudinal portion 38 are joined together at a second junction 40. The first inclined portion 30, the outer longitudinal portion 32, the second inclined portion 36 and the inner longitudinal portion 38 define a parallelogram configured wall structure 42, wherein the first junction 34 is diagonally positioned with respect to the second junction 40 and the outer maximum radial circumference 24 is diagonally positioned with respect to a third junction 44, formed at the intersection of the first inclined portion 30 and the inner longitudinal portion 38. Although the parallelogram configured wall structure 42 may be a preferred shape of the present invention, other configurations such as a right circular cylinder (not shown) or any other generally cylindrical configurations having an axial bore 22 therethrough.

After the dry lubricant impregnated anti-extrusion apparatus 20, as illustrated in FIG. 3, has been singly die formed, the dry lubricant impregnated anti-extrusion apparatus 20 may, if desired, be "sintered" or heated to achieve a desired stiffness or cohesiveness of the dry lubricant 18 to suit a specific need.

As illustrated in FIGS. 6 and 7, the parallelogram configured wall structure 42 of the anti-extrusion apparatus 20 is designed for operative engagement with an axial end 48 of an annular seal or packer body 50. The radial circumference 24 of the second inclined portion 36 is preferably equal to or slightly larger than the circumference 52 of the packer 50, such that the axial ends 48 of the packer 50 are retained within the inner concave surface 28 of the dry lubricant impregnated anti-extrusion apparatus 20. In a typical downhole packer assembly 54, as depicted in FIGS. 6-7, a mandrel 56 or other tool is longitudinally disposed in an oil or gas well bore 58. The mandrel 56 generally retains the packer body 50 and at least one anti-extrusion apparatus 20, engaged to one or more axial ends 48 of the packer body 50, for preventing the extrusion and ultimate failure of the packer body 50, during compression. In addition to the mandrel 56, an upper sleeve 62 and a lower sleeve 63 may be in operative engagement with the mandrel 56 and the packer body 50, to effect radial expansion of the packer body during engagement of an upper compressional sleeve 62 with a lower compressional sleeve 63.

OPERATION

Figures 8, 9:
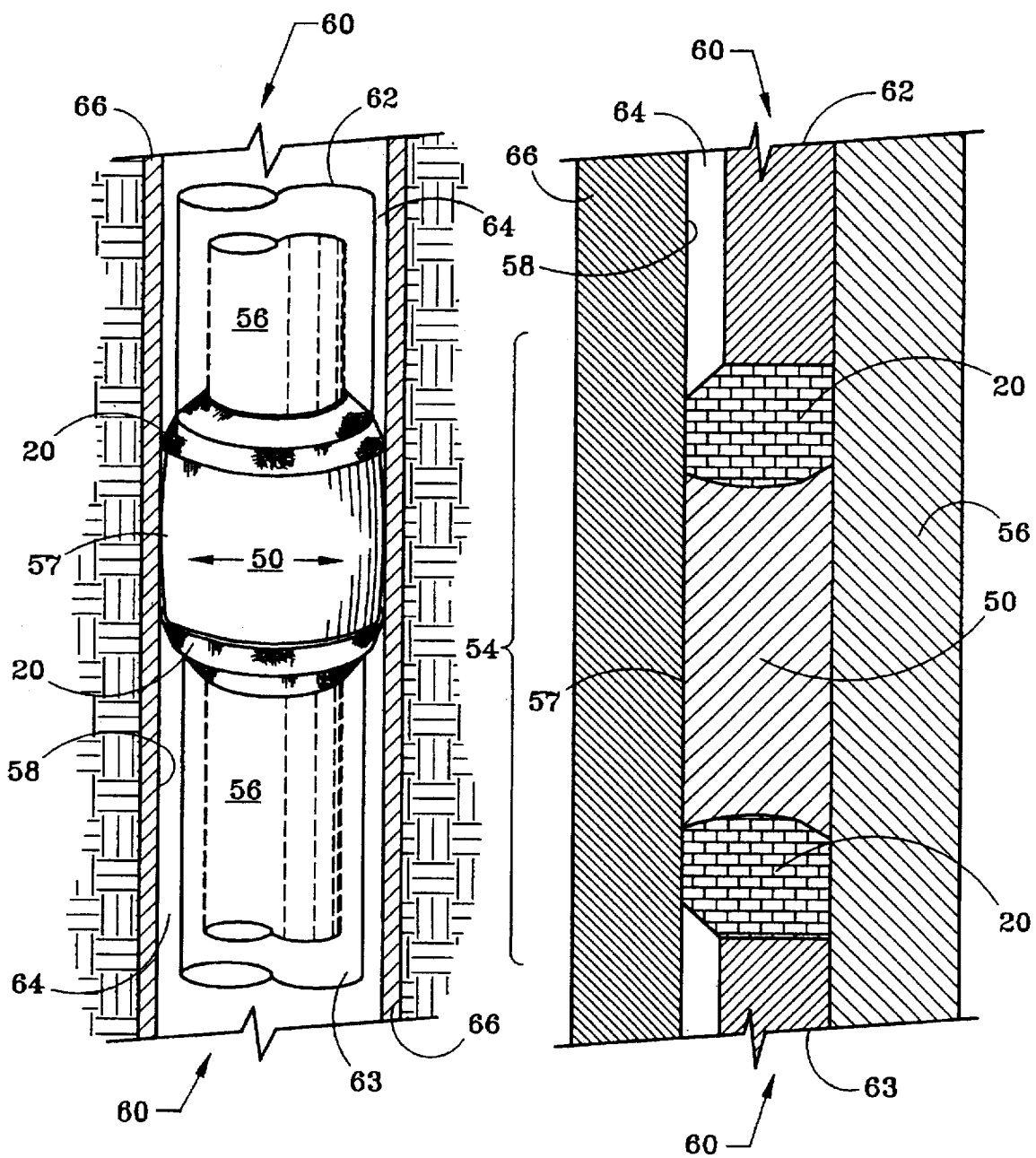
FIG. 8 is a front view of the dry lubricant impregnated anti-extrusion apparatuses and packer body, during compression, wherein the compressed dry lubricant impregnated anti-extrusion apparatuses make low frictional contact with the inner surface of the tubular member to prevent the extrusion of the packer body while transmitting substantially all of the compression setting forces to the packer body, to effectively seal the annulus of the tubular member.
FIG. 9 is a cross-sectional view of the compressed dry lubricant impregnated anti-extrusion apparatuses in combination with the packer body, as depicted in FIG. 8.

With reference now to FIGS. 8 and 9, the function of the dry lubricant impregnated anti-extrusion apparatus 20 is illustrated. The packer body 50 is generally positioned within the well bore 58 at a predetermined depth, at which point compression setting forces 60, created by the compaction of the upper compressional sleeve 62 with the lower compressional sleeve 63, are applied to the anti-extrusion apparatus 20 and/or packer body 50 to cause the packer body 50 to radially expand and create a seal 57 within an annulus 64 of the well bore 58. The upper compressional sleeve 62 and the lower compressional sleeve 63, illustrated in FIGS. 8–9, are in compressive engagement with the compressed and radially expanded dry lubricant impregnated anti-extrusion apparatus 20 and the compressed and radially expanded packer 50. When the upper compressional sleeve 62 and the lower compressional sleeve 63 are activated, and begin compression in a central direction toward the packer body 50, axial compression setting forces 60 are created. When using the present invention, the axial compression setting forces 60 are generally first applied to the dry lubricant impregnated anti-extrusion apparatus 20, which in turn transmit substantially all of the axial compression setting forces 60 to the packer body 50. In response to the axial compression setting forces 60, the packer body 50 expands laterally to form the seal 57 within the annulus 64 the well bore 58 of a tubular member 66, while generally preventing the extrusion of the packer body 50. The dry lubricant impregnated anti-extrusion apparatus 20, generally prevents extrusion or deformation of the packer body 50 into the annulus 64 adjacent to the upper compression sleeve 62 and/or lower compression sleeve 63, by uniform distribution of the dry lubricant impregnated anti-extrusion apparatus 20, between the tubular member 66 and the mandrel 56, thereby efficiently retaining the packer body 50 between the boundary created by the tubular member 66, the mandrel 56 and the dry lubricant impregnated anti-extrusion apparatus 20. The improved and more efficient transmittal of compression setting forces 60 through the dry lubricant impregnated anti-extrusion apparatus 20 of the present invention, results in better radial expansion capabilities of the packer body 50, while using up to 40% less compressive force 60, as compared to conventional, non-dry lubricant impregnated anti-extrusion devices (not shown) and in the absence of generally extruding or damaging the packer body 50. The dry lubricant impregnated anti-extrusion apparatus 20 of the present invention, has the added benefit of reducing internal frictional forces within the present invention during compression, such that substantially lower axial compression forces can be efficiently transmitted through the dry lubricant impregnated anti-extrusion apparatus 20 to the packer body 50 to radially expand the packer body 50 to form the seal 57 within the annulus 64 of the well bore 58. The greater the efficiency in transmitting the compression setting forces 60 to the packer body 50, the less absorption of the compression setting forces 60 will occur by the anti-extrusion apparatus 20 and the less compression force 60 is needed to radially expand the packer body 50 to effectively form the seal 57 within the annulus 64 of the well bore 58.

The foregoing description of the invention is illustrative and explanatory thereof. Various changes in the materials, apparatus, and particular parts employed will be apparent to those skilled in the art. It is intended that all such variations within the scope and spirit of the appended claims be embraced thereby.

What is claimed is:

1. An anti-extrusion apparatus for preventing the extrusion of a radially expansive elastomeric annular seal disposed within a tubular member, wherein the elastomeric annular seal is experiencing axial compression forces to radially expand the elastomeric annular seal to close off an annular area of the tubular member, said anti-extrusion apparatus comprising:

an expandable, deformable, ring-shaped, steel mesh structure formed of at least one strand, said at least one strand being interwoven to form a plurality of pores; said pores being substantially impregnated with polytetrafluoroethylene to reduce the internal friction within the structure during expansion and deformation of said structure, wherein the structure is then sintered, and the deformation and expansion of said structure causes said structure to spread radially outward between the elastomeric annular seal and the axial compression forces to transfer substantially all of the axial compression forces to the annular seal, while generally preventing extrusion of the annular seal, wherein the structure generally retains all of the polytetrafluoroethylene during radial expansion.

2. The anti-extrusion apparatus as defined in claim 1, said ring-shaped steel mesh structure being singly die formed to form a concave interior surface, a frustro-conical exterior surface and having a continuous, concentric axial bore disposed through said ring-shaped steel mesh structure.

3. The anti-extrusion apparatus as defined in claim 2, wherein said concave interior surface of said ring-shaped steel mesh structure is adapted to engage at least one axial end of the annular seal.

4. The anti-extrusion apparatus as defined in claim 3, wherein the deformation and expansion of the ring-shaped steel mesh structure in combination with the annular seal, provides for the delivery of high, low and intermediate axial compression forces, to be directly conveyed against said annular seal, in the absence of extruding said annular seal.

5. The anti-extrusion apparatus as defined in claim 4, wherein the pores of the ring-shaped steel mesh structure are substantially impregnated with polytetrafluoroethylene to significantly reduce the friction between the ring-shaped steel mesh structure and an internal surface of the well bore during radial expansion of said ring-shaped steel mesh structure.

6. An anti-extrusion apparatus for preventing the extrusion of a radially expansive elastomeric annular seal disposed within a tubular member, wherein the anti-extrusion apparatus and the elastomeric annular seal are experiencing axial compression forces, said anti-extrusion apparatus comprising:

an expandable, deformable ring-shaped steel mesh structure to engage at least one axial end of the annular seal, said ring-shaped steel mesh structure being formed of at least one steel strand being interwoven to form a continuous mesh layer having a plurality of pores therein; said pores being substantially impregnated with polytetrafluoroethylene, said polytetrafluoroethylene impregnated ring-shaped mesh structure being singly die formed and sintered, wherein the radial expansion and deformation of the ring-shaped steel mesh structure by the axial compression forces transfers substantially all of the axial compression forces to the annular seal to close off the annular area of the tubular member, while generally preventing extrusion of the annular seal and substantially eliminating friction within the ring-shaped steel mesh structure.

7. The anti-extrusion apparatus as defined in claim 6, said ring-shaped steel mesh structure being singly die formed to form a concave interior surface, a frustro-conical exterior surface and having a continuous, concentric axial bore disposed through said ring-shaped mesh body.

8. The anti-extrusion apparatus as defined in claim 6, wherein the radial expansion and deformation of the ring-shaped mesh structure in combination with the annular seal, provides for the substantial delivery of high, low and intermediate axial compression forces, to be directly conveyed against said annular seal, in the absence of extruding said annular seal.

9. A method of making an anti-extrusion apparatus for preventing the extrusion of a radially expansive elastomeric annular seal disposed within a tubular member, wherein the elastomeric annular seal is experiencing axial compression forces to radially expand the annular seal to close off an annular area of the tubular member, comprising the steps of:

forming a deformable and expandable ring-shaped mesh structure from at least one strand of steel, forming a plurality of pores therein;

impregnating substantially, the pores of the deformable and expandable ring-shaped steel mesh structure with polytetrafluoroethylene;

die forming the polytetrafluoroethylene impregnated ring-shaped steel mesh structure to form a structure having a frustro-conical outer surface, a concave inner surface and a concentric axial bore; and sintering the die formed, polytetrafluoroethylene impregnated ring-shaped steel mesh structure to achieve a desired cohesiveness of the polytetrafluoroethylene.

\* \* \* \* \*